United States Patent [19]
Honda

[11] Patent Number: 6,160,488
[45] Date of Patent: Dec. 12, 2000

[54] ANTI-THEFT DEVICE USING CODE TYPE TRANSPONDER

[75] Inventor: Takayoshi Honda, Nagoya, Japan

[73] Assignee: Denso Corporation, Kariya, Japan

[21] Appl. No.: 08/950,139

[22] Filed: Oct. 14, 1997

[30] Foreign Application Priority Data

Oct. 14, 1996 [JP] Japan .................................. 8-271099

[51] Int. Cl.[7] .................................................. G07D 7/00
[52] U.S. Cl. ............................ 340/825.34; 340/825.31; 340/825.32
[58] Field of Search .................... 340/825.34, 825.32, 340/825.31, 426, 825.54, 10.5, 10.51; 307/10.5, 10.3

[56] References Cited

U.S. PATENT DOCUMENTS

| | | |
|---|---|---|
| 5,146,215 | 9/1992 | Drori . |
| 5,621,380 | 4/1997 | Mutoh et al. ............................ 340/426 |
| 5,635,900 | 6/1997 | Hasegawa et al. ...................... 340/426 |
| 5,640,057 | 6/1997 | Hirata et al. . |
| 5,745,026 | 4/1998 | Kokubu et al. ......................... 340/426 |

FOREIGN PATENT DOCUMENTS

| | | |
|---|---|---|
| 671 528 | 9/1995 | European Pat. Off. . |
| 2-24056 | 5/1990 | Japan . |
| 4-130571 | 11/1992 | Japan . |
| 7-15671 | 2/1995 | Japan . |
| 8-268228 | 10/1996 | Japan . |
| 96-30236 | 10/1996 | Japan . |
| 2 282 687 | 4/1995 | United Kingdom . |
| 2 294 144 | 4/1996 | United Kingdom . |

*Primary Examiner*—Michael Horabik
*Assistant Examiner*—Prenell P. Jones
*Attorney, Agent, or Firm*—Pillsbury Madison & Sutro LLP

[57] ABSTRACT

A method for registering a new key in an anti-theft device allows the registration of a new key having a code type transponder from which authentication data once written cannot be read out or written over. An ECU communicates with a transponder of a registered key such as a master key and allows an engine to be started when the result of a collating function data stored in an EEPROM of the ECU with function data written in the transponder is a match. When function data is to be written into a transponder of an unregistered new key, the ECU first communicates with the transponder of the registered key and, when the result of collation of the function data stored in the EEPROM and the function data written in the transponder of the registered key is a match, writes function data stored in the EEPROM into the transponder of the new key.

34 Claims, 10 Drawing Sheets

ANTI-THEFT DEVICE USING CODE TYPE TRANSPONDER

CROSS-REFERENCE TO RELATED APPLICATION

This application is related to Japanese Patent Application No. Hei 8-271099, incorporated herein by reference.

BACKGROUND OF THE INVENTION

1. Field of the Invention

This invention relates to a method and a device with which it is possible to carry out registration of a new key, i.e. a key which is not already a registered key such as a master key, in an anti-theft device.

2. Description of Related Art

To enable a vehicle to be used by a number of different people, keys made by copying a master key are sometimes newly added to existing keys for starting the engine of or locking and unlocking doors of the vehicle. In the case of a vehicle having an anti-theft function, when newly adding a key it is necessary to register the new key with an electronic control unit (hereinafter abbreviated to ECU) having an anti-theft function by conducting communication between the ECU and a transponder disposed inside the new key.

In conventional new key registration, authentication data pre-written into a R/O (read-only) transponder disposed inside the new key is read out from the transponder and this data is transmitted to the ECU and written and stored in the ECU.

However, recently, to prevent the copying of keys by thieves, code type transponders, with which once authentication data has been written in the transponder the authentication data cannot be written over or read out, save started to be used.

With a code type transponder, since the authentication data cannot be read out, there is the problem that when the conventional method is used it is not possible to register a new key having a code type transponder in the ECU.

SUMMARY OF THE INVENTION

It is therefore an object of the present invention to provide a method and a device with which it is possible to register a new key having a code type transponder.

The above object is achieved according to an aspect of the present invention by providing a method for registering a new key in an anti-theft device including preparing a new key having a transponder in which authentication data has not been written, conducting communication between a transponder of a registered key and an electronic control unit having an anti-theft function, and determining if the communication was conducted correctly, enabling registration of a new key when it is determined that the communication was conducted correctly, and, when registration of a new key is enabled, conducting communication between the transponder of the new key and the electronic control unit and writing registered key authentication data stored in the electronic control unit into the transponder of the new key. In this way, by using the authentication data of the master key stored in the ECU, even a new key having a code-type transponder can be appropriately registered.

By making the collation of a pre-registered master key a condition of registration of a new key it is possible to set a restriction on the registration of new keys. That is, for example, when the anti-theft device is applied to a vehicle, in the case of a rental car or and the like a registered key is loaned out together with the vehicle for the rental period, but if this registered key is not a master key then new keys being registered unlawfully using this loaned-out registered key can be prevented.

Whether each of a number of electronic keys having the same authentication data is a master key or a sub-key can be distinguished by means of a key identification code assigned uniquely to each key.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

First Embodiment

Figure 1:
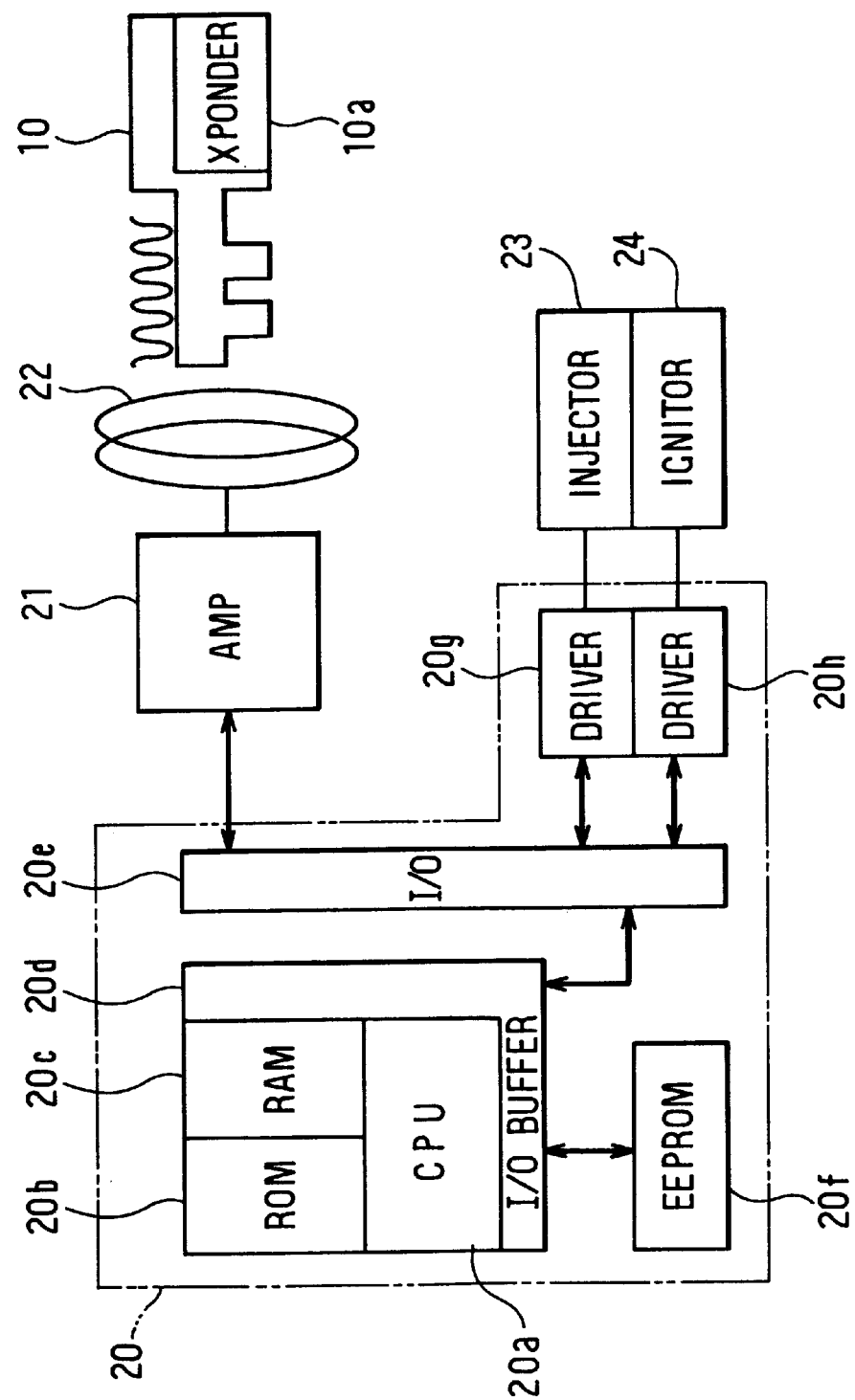
FIG. 1 shows the construction of an anti-theft device according to a first preferred embodiment of the invention.

The construction of an anti-theft device for a vehicle is shown in FIG. 1.

A key (a master key or another registered key; in the following description, a master key) 10 has a built-in transponder 10a. This transponder 10a is a code type transponder in which is written function data serving as authentication data and which, when receiving an excitation signal (for example, a sine wave of a predetermined frequency) from the vehicle side, stores energy of the excitation signal in a capacitor and operates with this energy as a power supply.

On the vehicle side there are provided an ECU 20 having an anti-theft function and an amplifier circuit 21 for receiving an excitation starting signal from the ECU 20 and transmitting an excitation signal to the master key 10. The ECU 20 is made up of a CPU 20a, a ROM 20b, a RAM 20c, an input/output buffer 20d, an input/output circuit 20e and an EEPROM 20f. The same function data as the function data stored in the transponder 10a is stored in this EEPROM 20f.

The ECU 20 communicates with the transponder 10a of the master key 10 and collates the function data stored in the EEPROM 20f with the function data written in the transponder 10a and, when it determines that result of this collation is a match, enables the engine to be started. That is, it commences control of the injector 23 and the ignitor 24 by way of the driving circuits 20g, 20h.

In the following description, the function data written in the transponder 10a will be written Ft(X) and the function data stored in the EEPROM 20f will be written Fe(X).

The communication and the collation of function data between the ECU 20 and the transponder 10a are carried out in the following way.

First, the CPU 20a outputs an excitation starting signal to the amplifier circuit 21 and thereby causes an excitation signal to be transmitted from an antenna 22 to the transponder 10a of the master key 10. After a predetermined time (for example, 50 ms) the CPU 20a outputs an excitation stopping signal to the amplifier circuit 21 and thereby stops the transmission of the excitation signal from the antenna 22. As a result of this transmission of the excitation signal for a predetermined time, the transponder 10a becomes operational.

After that, the CPU 20a outputs query data X (a set of data generated using random numbers; different data every time) to the amplifier circuit 21. The amplifier circuit 21 converts "1" and "0" signal group data from the CPU 20a into frequencies (for example, frequency B for "1" and frequency C for "0"), and transmits this to the transponder 10a from the antenna 22.

The transponder 10a uses the function data Ft(X) to calculate response data Yt from the query data X and the function data Ft(X), and transmits this to the antenna 22 as a data group of the frequencies B and C. The amplifier circuit 21 converts the frequency data received by the antenna 22 into a data group of "1" and "0" and outputs this to the CPU 20a. As the function data Ft(X), for example, a four-rule operator such as $Ft(X)=(x^2+x)/5+X/2+x^{-1/2}+\ldots$ can be used.

The CPU 20a also obtains response data Ye from the query data X transmitted to the transponder 10a and the function data Fe(X) (which is the same function data as that of the transponder 10a if the transponder 10a is a correct transponder) stored in the EEPROM 20f.

The CPU 20a then compares the two sets of response data Yt and Ye, and if they match makes the determination "correct transponder" (the function data in the transponder 10a and the function data stored in the EEPROM 20f are the same) and enables the engine to be started, and if they do not match prevents the engine from operating.

Figure 2A:
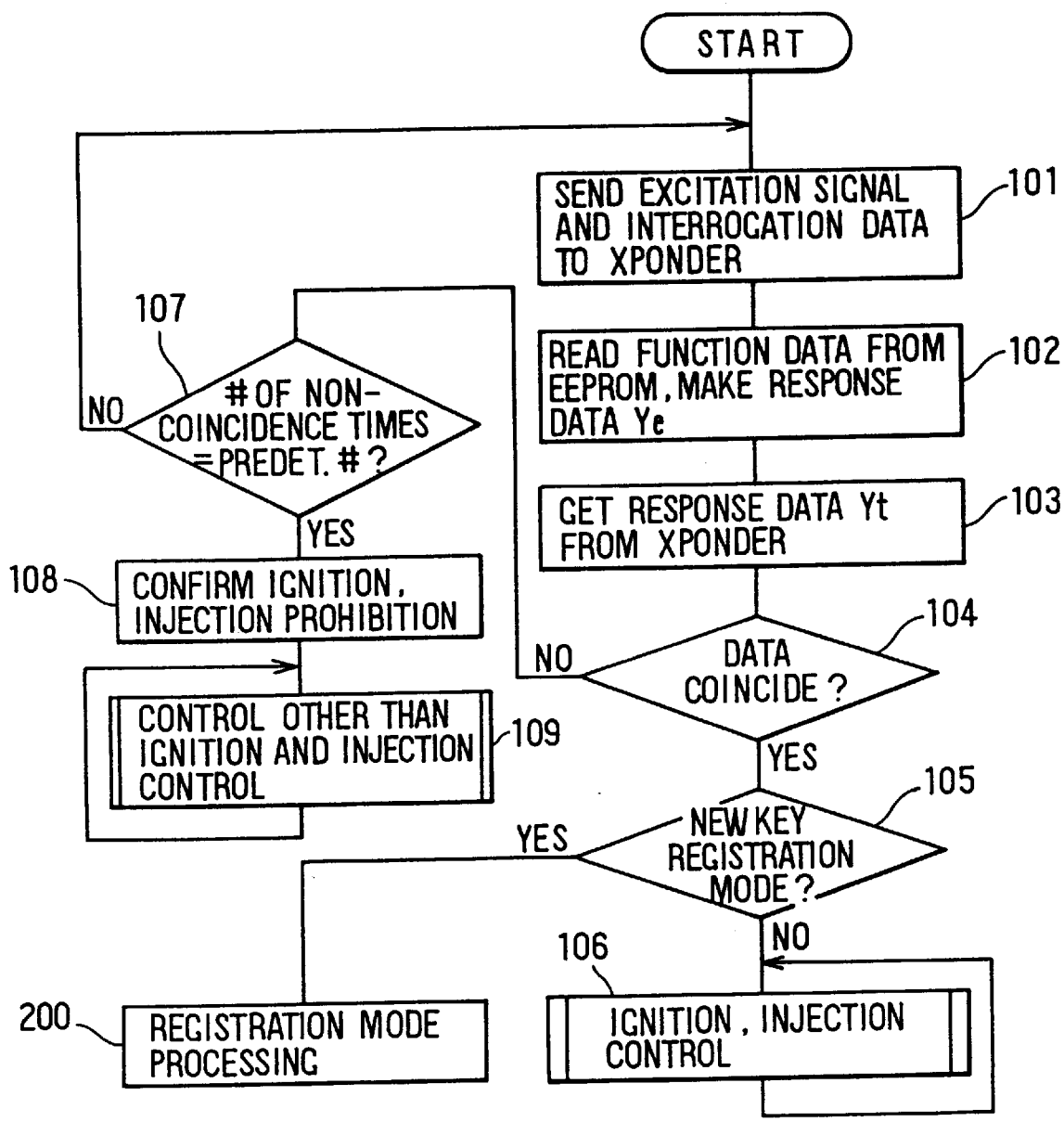
FIGS. 2A and 2B are flowcharts showing specific processing of a CPU in FIG. 1.

Next, the operation of the CPU 20a will be described with reference to the flowchart of FIG. 2A showing specific processing carried out by the CPU 20a.

When the master key 10 is inserted into a key cylinder and a key switch (IG switch) is turned on, the electrical system shown in FIG. 1 receives power from a vehicle battery and becomes operational.

First, normal operation for starting the engine using the master key 10 will be described.

When the power supply is switched on, an excitation signal and query data X are transmitted to the transponder 10a (Step 101) and then response data Ye is obtained from the query data X and the function data Fe(X) stored in the EEPROM 20f (Step 102) and also response data Yt is read out from the transponder 10a (step 103).

Data collation comparing the two sets of response data Yt, Ye is then carried out (step 104). When the collation result is a match and key identification codes which will be further discussed later also match, the transponder 10a is determined to be a "correct transponder" and processing goes through a registration mode determination (step 105; this processing will be discussed later) and then carries out ignition and fuel injection control of the engine (step 106). However, when the collation result is a mismatch the processing of steps 101 though 104 is repeated, and when the number of failures to match reaches a predetermined number, the determination of a step 107 becomes YES and the determination "abnormal transponder" is made and it is confirmed from the outputs of the driving circuits 20g, 20h that ignition and fuel injection are being prohibited (step 108) and control processing other than engine control (for example, processing displaying the abnormality with an LED or the like) is executed (step 109). Thus, in this case, the engine is not operated.

As will be understood from the foregoing description, using the function data written in the transponder 10a of the master key 10 it is possible to prevent theft of the vehicle.

Next, the case of registering a new key having its shape copied from the shape of the master key will be discussed.

In this case, the master key 10 is inserted into the key cylinder, the ECU 20 is operated and confirmation of the master key 10 is carried out. First, when the power supply is switched on by the insertion of the master key 10, the CPU 20a communicates with the transponder 10a of the master key 10 and determines whether or not communication has been conducted correctly (the processing of steps 101 through 104).

When it is determined that communication has been conducted correctly, after this determination, it is determined whether or not within a predetermined time (for example 10 seconds) a registration operation for carrying out registration of a new key has been carried out (step 105). For example, it is determined whether or not a predetermined registration operation such as turning the IG switch on and off three times or turning a door switch on and off four times has been carried out by a user (operator registering a new key). When this kind of registration operation is carried out, new key registration is enabled and registration mode processing 200 is executed. When the master key 10 is used to operate the starter, the determination of step 105 is NO and immediate engine starting is made possible.

Figure 3:
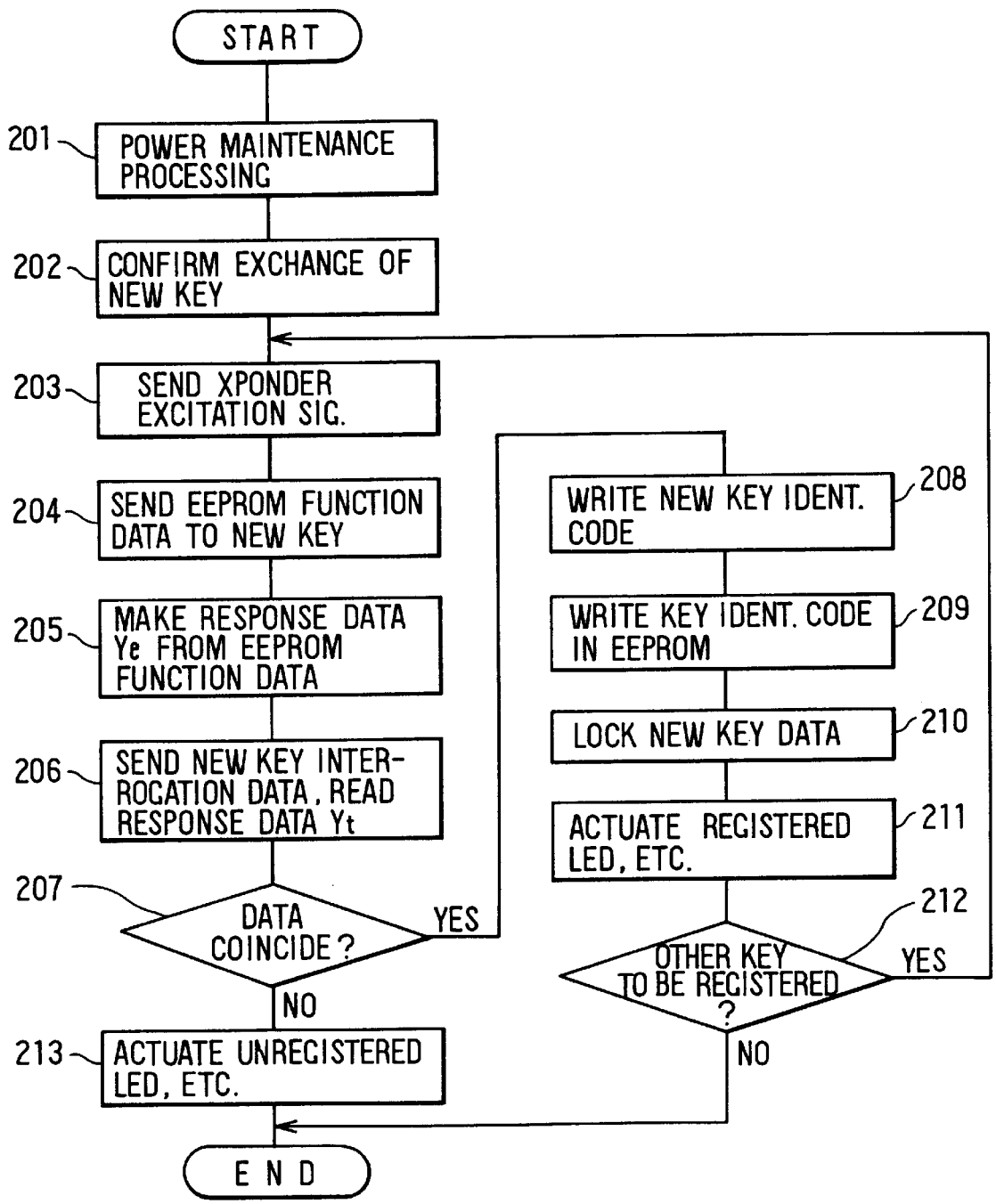
FIG. 3 is a flowchart showing details of registration mode processing in FIG. 2A.

The specific processing of this registration mode processing 200 is shown in FIG. 3.

After carrying out the registration operation described above, the user replaces the master key 10 in the key cylinder with a new key. Because at the time of this key replacement the key switch is temporarily turned off, when processing enters the registration mode, first, power supply holding processing is carried out (step 201). In this case, a power supply holding circuit (not shown) is operated to maintain the power supply to the ECU 20 for a predetermined time.

After that, the CPU 20a confirms that the master key 10 has been replaced with a new key (step 202). For example, the key replacement can be confirmed using a key insertion switch (not shown) detecting the state of insertion of a key into the key cylinder.

Next, an excitation signal is transmitted to the transponder of the new key and that transponder is thereby rendered operational (step 203), and the function data Fe(X) stored in the EEPROM 20f is transmitted to the transponder of the new key and written into the transponder as function data Ft(X) (step 204). After that, query data X is prepared and response data Ye is obtained using the function data Fe(X)

stored in the EEPROM 20f (step 205), and also the query data X is transmitted to the transponder of the new key and response data Yt based on the function data Ft(X) just written is read out (step 206).

Data collation comparing the two sets of response data Yt, Ye is then carried out (step 207). If the collation result is a match, it is inferred that the function data Ft(X) has been correctly written into the new key and then a key identification code (key number) is written into the transponder of the new key (step 208) and the same key identification code is also written into the EEPROM 20f (step 209). When the key identification code is entered into the new key, so that keys having the same key identification code are not made, a key identification code which has not been used before is set. For example, with respect to a vehicle in which key identification codes 1 to 5 are preset, at the time of addition of new keys, key identification codes other than 1 to 5, such as 6, 7, . . . , are set.

Also, lock processing for writing a lock code into the transponder of the new key is carried out, and further writing of data into the transponder is thereby rendered impossible (step 210). After that, the fact that the new key has been registered is made known to the user by a display device such as an LED (step 211).

After that, when it is ascertained that the new key has been removed and been replaced with another new key within a predetermined time, the determination of step 212 becomes YES and the registration processing of step 203 onward is carried out with respect to the other new key.

When it is determined in step 207 that the data collation result is a mismatch, the fact that the new key has not been registered is made known to the user by displaying means such as an LED (step 213).

Therefore, by looking at the LED or other displaying means, the user can check whether or not registration of the new key has been carried out.

In the above-mentioned steps 104 and 207, data collation carried out by comparing the two sets of response data Yt, Ye was described; however, the key identification code written into the transponder is read out and determination of whether or not that key identification code matches any of the key identification codes stored in the EEPROM 20f is also carried out, and the collation result is deemed to be a match when both the response data and the key identification code match.

Figure 4:
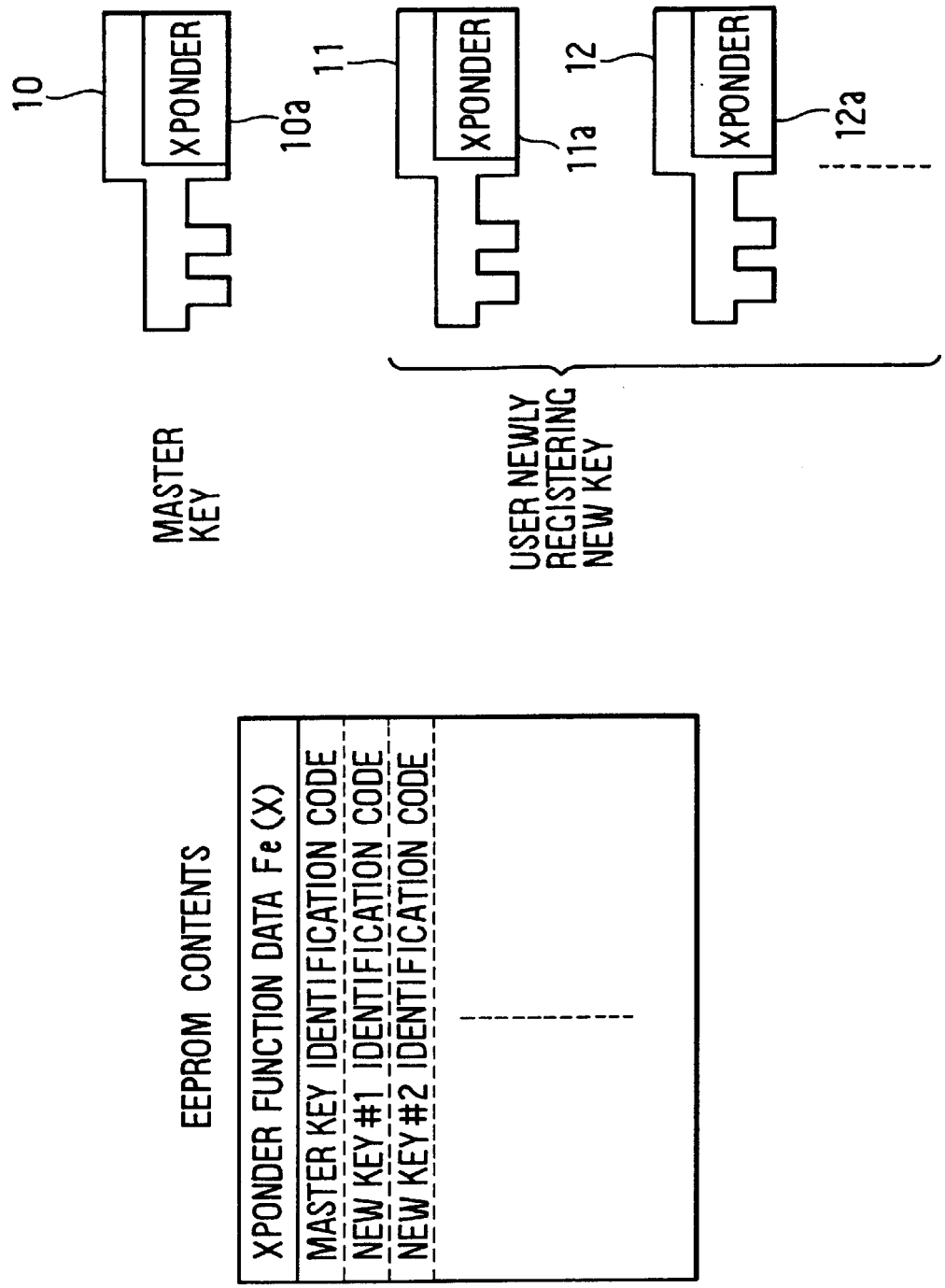
FIG. 4 shows a relationship of correspondence between a master key, new keys and content stored in an EEPROM in FIG. 1.

The correspondence relationship between the master key 10, new keys 11, 12 . . . and the stored content of the EEPROM 20f is shown in FIG. 4. The new keys 11, 12 . . . respectively have built in transponders 11a, 12a. . . Function data Fe(X) common to all the keys is stored in the EEPROM 20f. Therefore, the storage capacity of the EEPROM 20f can be made much smaller than when function data Fe(X) is stored individually with respect to each of a plurality of keys. Also, since when the response data is being produced, the computation of step 102 need only be carried out for one set of function data, reduction of the processing load is possible. Key identification codes are also stored in the EEPROM 20f in correspondence with the master key 10 and the new keys 11, 12. . .

As a result of a key identification code for each key being stored in the EEPROM 20f in this way, when a key is lost, if the key identification code of that key is erased from the EEPROM 20f, even if the lost key were to be used, because its key identification code would not match any key identification code stored in the EEPROM 20f, theft of the vehicle would be prevented.

In the first preferred embodiment described above, registration of a new key is enabled when collation of any already registered key is carried out; however, alternatively, collation of a pre-registered master key may be made a condition of registration of a new key, so as to place a restriction on the registration of new keys. This modified version of the first preferred embodiment will be described below.

Figure 2B:
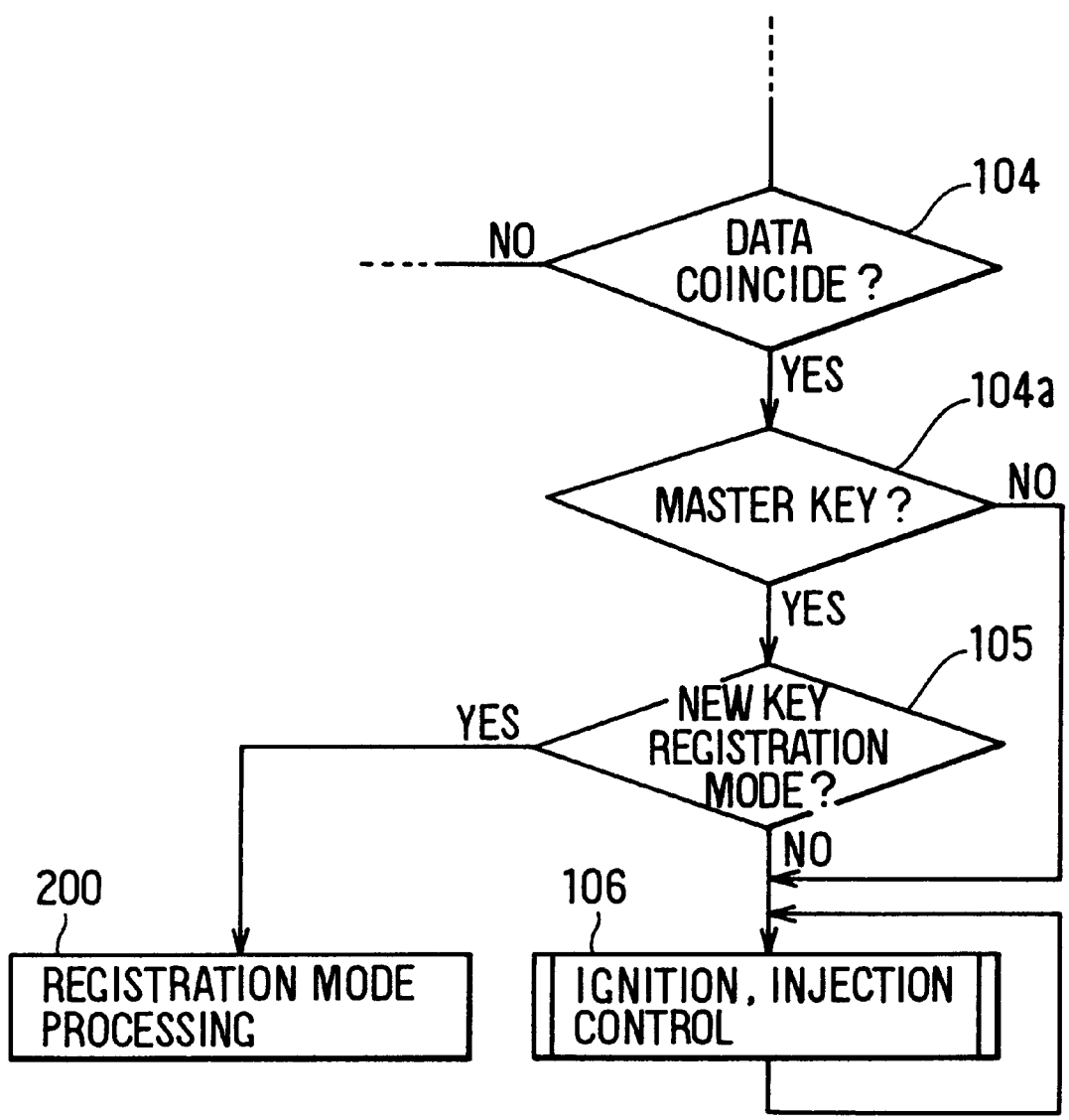

In the case of this modified version, after (on the basis of the data collation of step 104 shown in FIG. 2A) the result of the collation of the two sets of response data Yt, Ye is a match and the key identification code also matches and the determination "correct transponder" is made, a step 104a of distinguishing (on the basis of the key identification code) whether the key in the key cylinder is a master key or a sub-key is provided as shown in FIG. 2B, and when the key is recognized as a master key processing goes through the registration mode determination processing of step 105 and shifts to the engine control processing of ignition and fuel injection of step 106 as described above; but, when the key in the key cylinder is recognized as a sub-key, processing shifts directly to step 106. In this case, in the above-mentioned key distinguishing step, for example the key having the key identification code registered first in the EEPROM 20f at the time of shipping of the vehicle is recognized as the master key and any key newly registered thereafter is recognized from its key identification code as a sub-key.

By making collation of a pre-registered master key a condition of registration of a new key and thereby placing a restriction on the registration of new keys as in this modified version of the first preferred embodiment of the invention, when in the case of a rental car or the like a registered key is also loaned out during the vehicle rental period, if this loaned-out key is made a sub-key it is possible to prevent a new key being registered unlawfully.

In the above, an example wherein when a new key is registered using collation of a master key the new key is registered as a sub-key was described, but the invention is not limited to this and of course a construction may be adopted wherein it is determined at the time of registration of the new key that a predetermined operation has been carried out on, for example, a switch of the vehicle, and the new key may be selectively registered as a master key or a sub-key.

Also, although the preferred embodiment described above was an example wherein the authentication data (the function data Ft(X)) of all of a plurality of keys registered with respect to a single ECU 20, i.e. with respect to one vehicle, was the same and one corresponding function data Fe(X) was stored in the EEPROM 20f, the invention can be applied also in a case where for example there are a plurality of original master keys and each has different authentication data. In this case, the same authentication data as that of the master key used for the collation at the time of registration of a new key is written into the new key and keys having the same authentication data are recognized as a master key or a sub-key by the ECU 20 using the unique key identification code assigned to each key.

Second Embodiment

In the preferred embodiment described above, if the ECU 20 fails (for example, if the driving circuits 20g, 20h fail), the ECU 20 might be replaced with another ECU. In this case, unless the function data and key identification code (hereinafter referred to as function data, etc.) written in the registered keys such as the master key (in this preferred embodiment, also, the case of a master key will be used for the description) are stored in the new ECU, it will not be possible to continue to use the master key in the same way as before.

However, because the master key uses a code type transponder, it is not possible to read out the content written in it. Also, due to the lock applied after the writing of the data, the function data, etc. cannot be overwritten. Consequently, methods involving reading out the content written in the code type transponder and methods involving resetting the function data, etc. in the new ECU using the master key cannot be used.

To overcome this, in this preferred embodiment, in the failed ECU 20, collation using the master key is carried out, and when the collation result is a match the function data, etc. stored in the EEPROM 20f is written into the new ECU so that the master key can be used with the new ECU in the same way as before.

Figure 5:
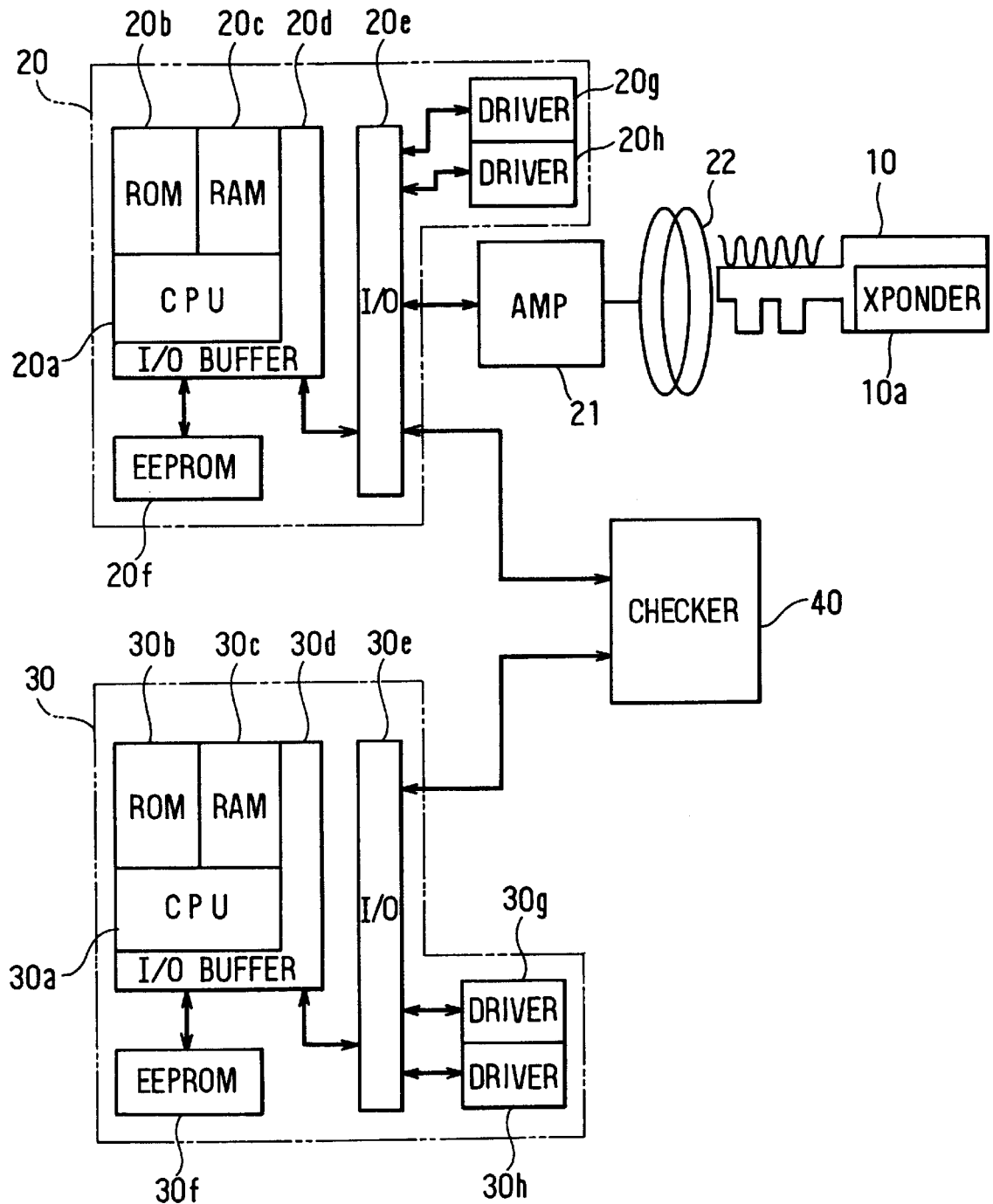
FIG. 5 is a view showing the construction of a second preferred embodiment of the invention.

A configuration for writing function data, etc. stored in the EEPROM 20f of a failed ECU 20 into a new ECU 30 is shown in FIG. 5.

The new ECU 30 is of the same construction as the failed ECU 20 and thus has the constituent elements 30a to 30h shown in the Figure. Also, function data, etc. stored in the EEPROM 20f of the failed ECU 20 can be written into the EEPROM 30f of the new ECU 30 by way of a checker 40. This checker 40 is a device originally used, for example, for reading diagnostics codes or carrying out RAM information testing work, and is constructed to carry out writing of function data, etc. into the new ECU 30 as well as these processes.

Figure 6:
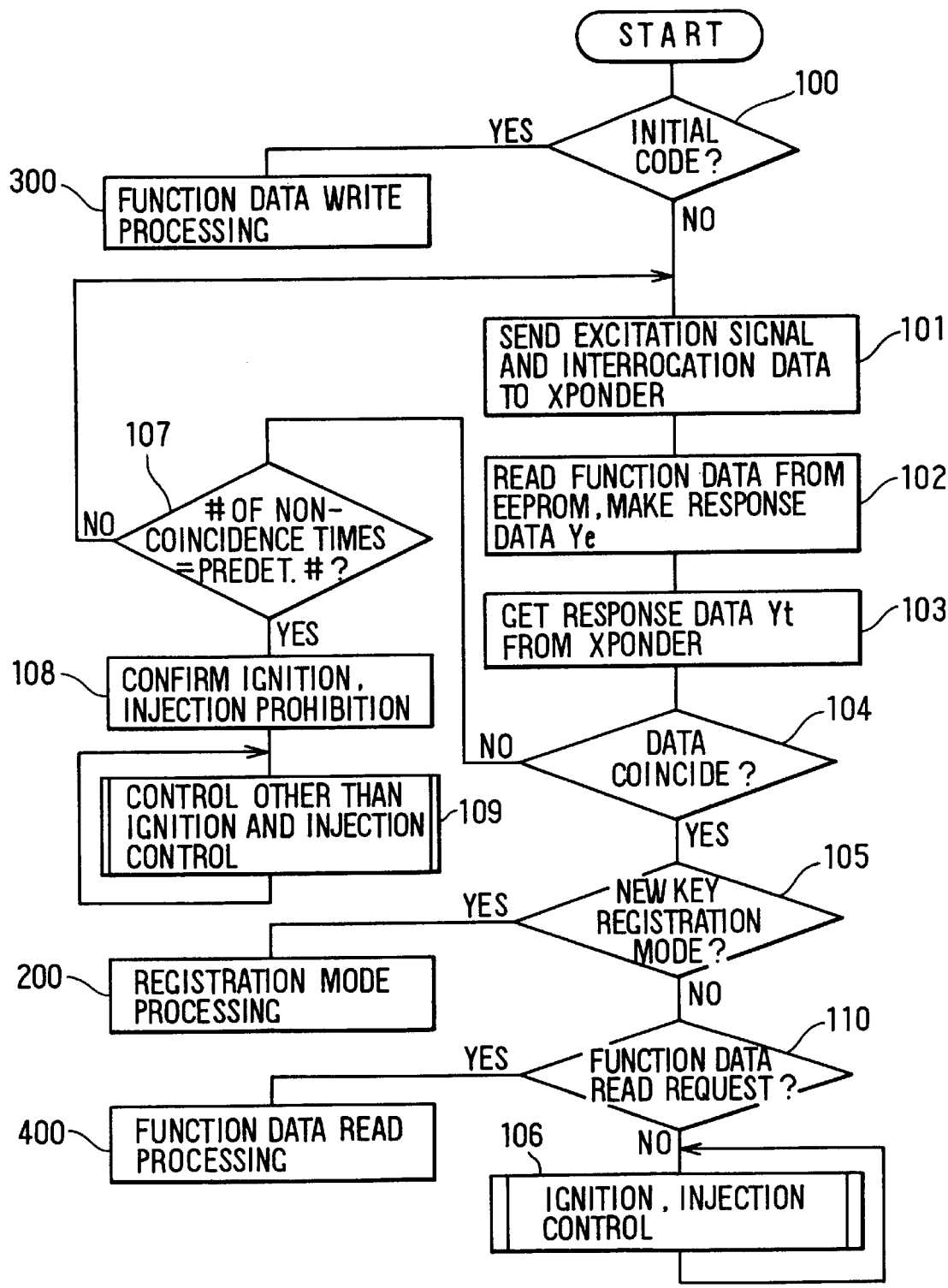
FIG. 6 is a flowchart showing specific processing carried out by CPUs in FIG. 5.

Processing executed by the CPU 20a in the ECU 20 and the CPU 30a in the ECU 30 (the CPUs 20a, 30a both execute the same processing) is shown in FIG. 6. It differs from the processing of FIGS. 2A and 2B and FIG. 3 of the first preferred embodiment in the point that the steps 100, 110, 300 and 400 have been added.

An initial code is originally stored in the EEPROM, and when storing of function data, etc. with a master key is carried out the function data, etc. is written over that initial code. Therefore, not the initial code but function data is stored in the EEPROM 20f, whereas the initial code is stored in the EEPROM 30f of the ECU 30.

Figure 7:
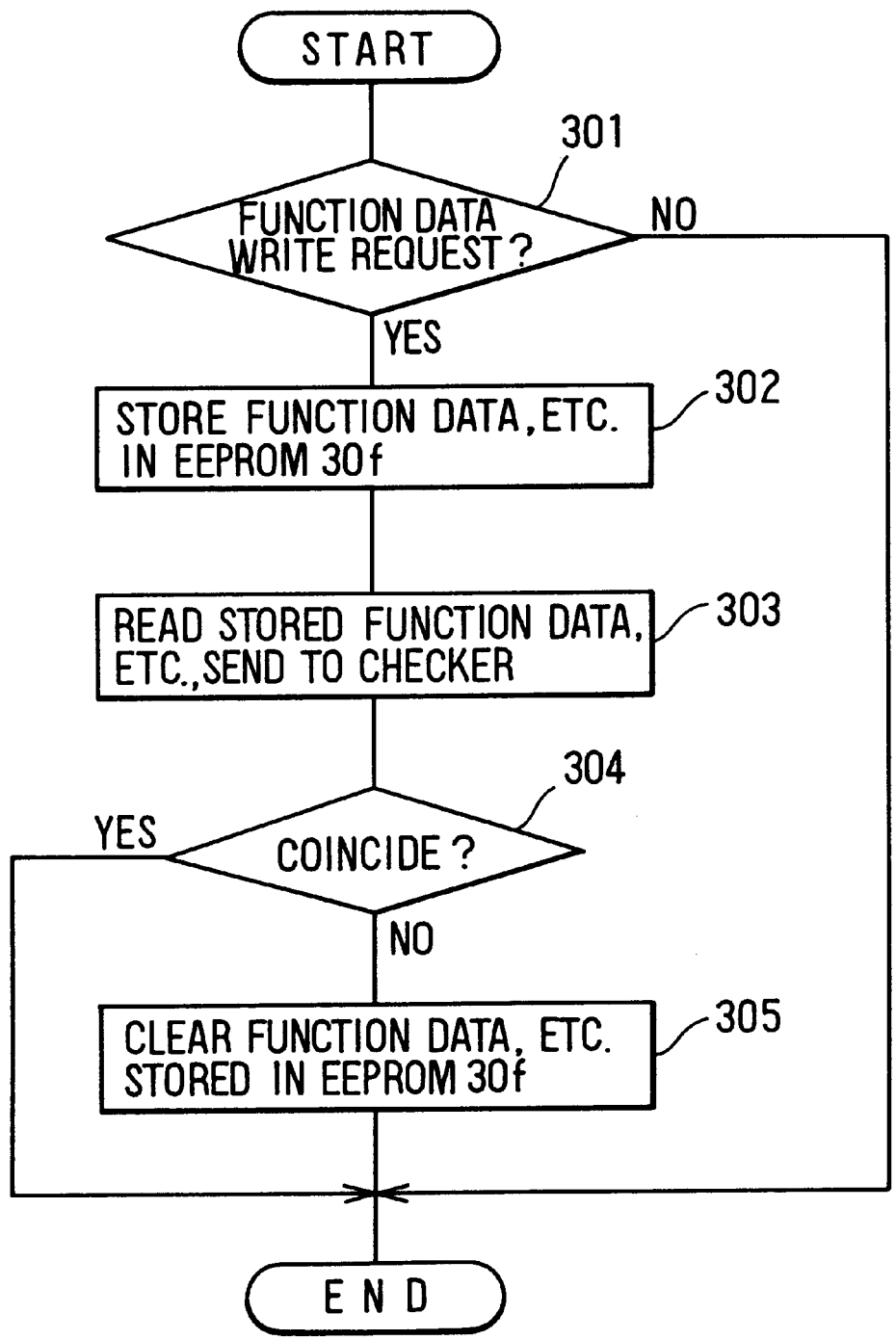
FIG. 7 is a flowchart showing function data, etc. writing in FIG. 6.
Figure 8:
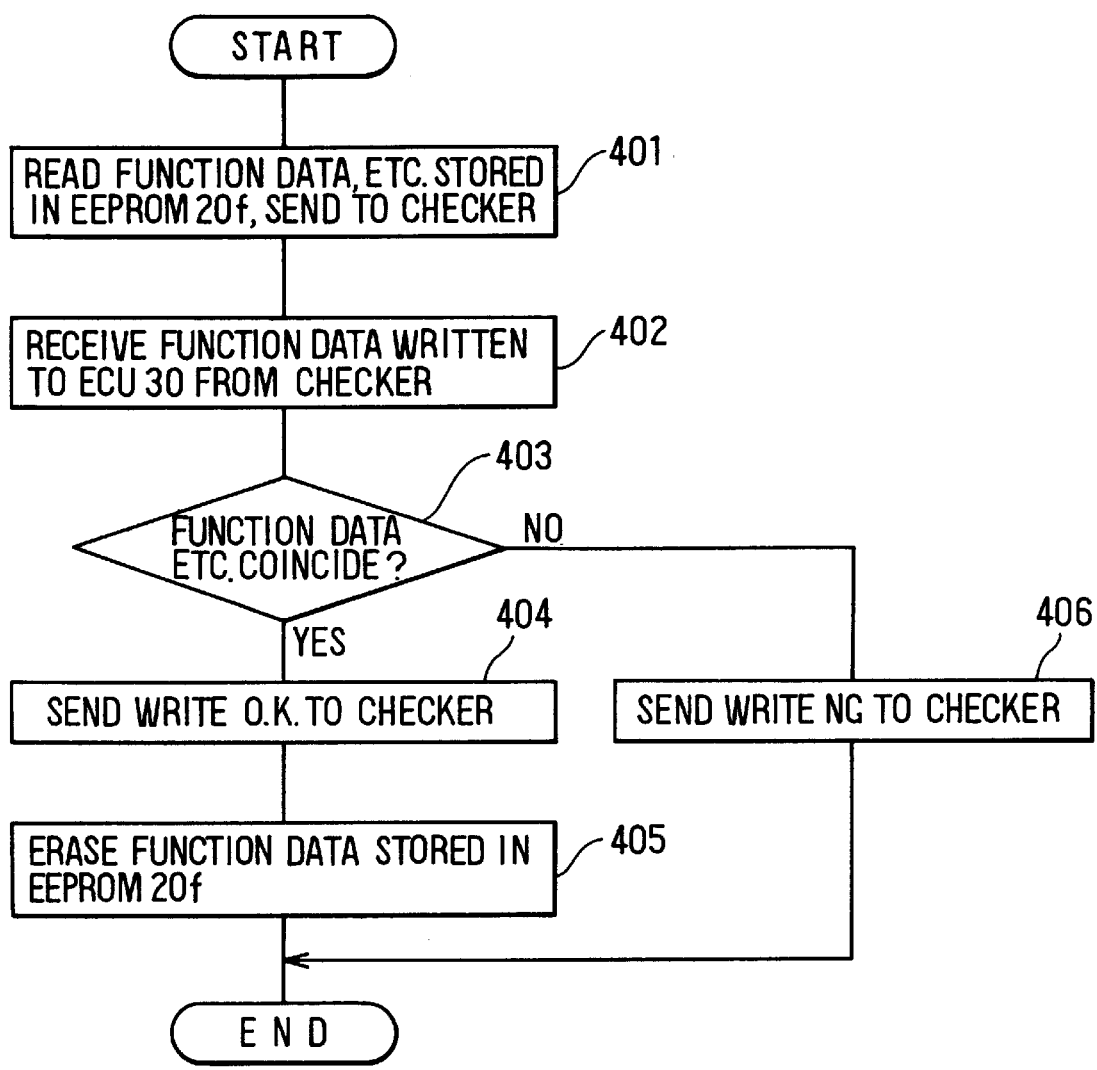
FIG. 8 is a flowchart showing function data, etc. reading in FIG. 6.

Consequently, when power is supplied to the ECU 20, ECU 30 (e.g., power from a vehicle battery or from an outside power source), in the CPU 30a of the new ECU 30, when step 100 is reached, the determination thereof is YES and function data, etc. write processing 300 (the detailed processing of which is shown in FIG. 7) is executed, and in the CPU 20a of the failed ECU 20, when step 100 is reached, the determination thereof is NO and the same collation of function data, etc. as that described in the first preferred embodiment is carried out, and when a request to read out function data, etc. has been issued from the checker 40 function data, etc. readout processing 400 (the detailed processing of which is shown in FIG. 8) is executed.

Figure 9:
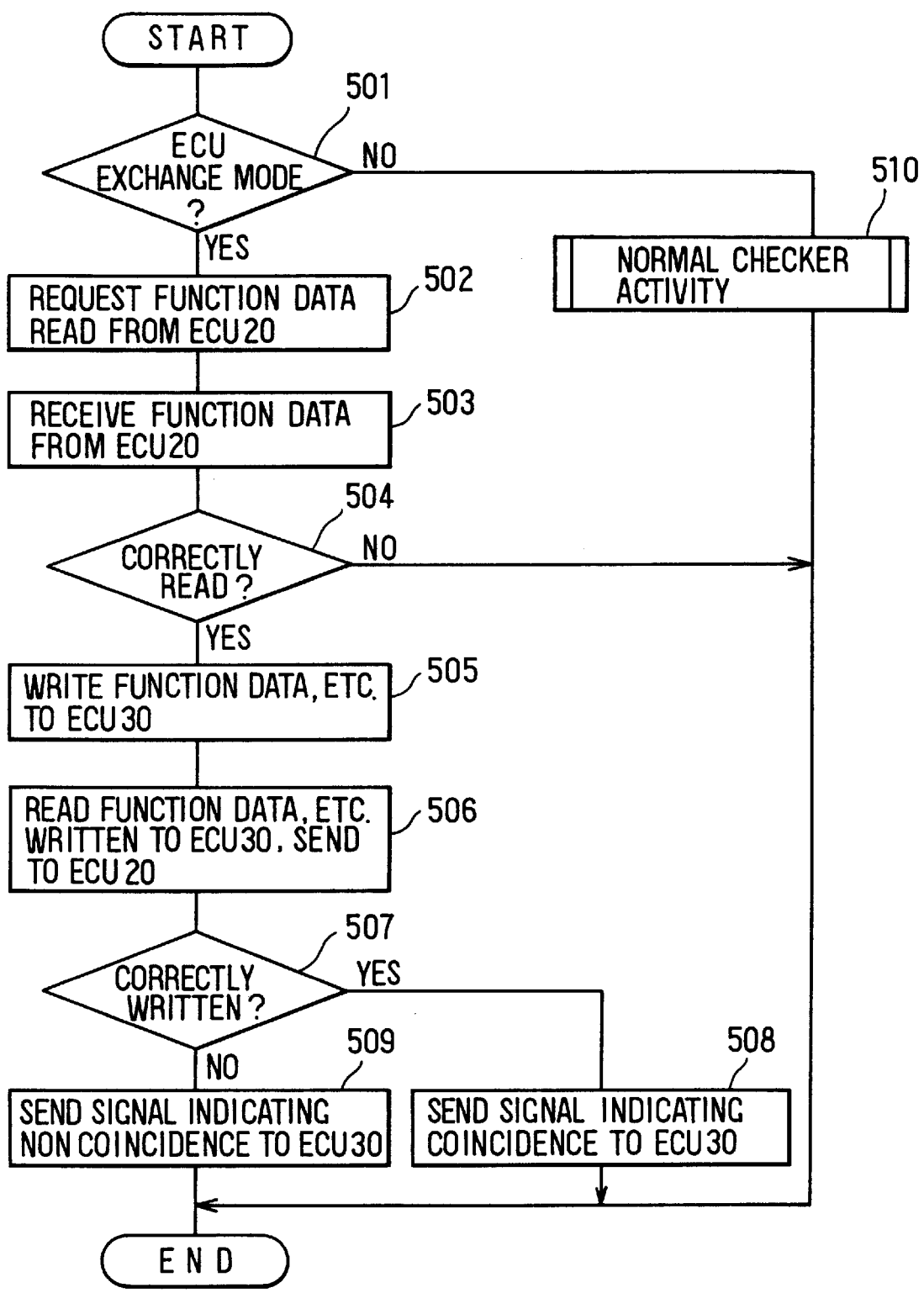
FIG. 9 is a flowchart showing processing carried out by a checker in FIG. 5.

Processing carried out by the checker 40 is shown in FIG. 9.

When power is supplied to the checker 40, it first determines whether or not it is in ECU replacement mode (step 501). The ECU replacement mode determination is carried out on the basis of whether or not a user has operated an ECU replacement switch (not shown). When it is not in ECU replacement mode, the original operation of the checker 40 mentioned above is carried out (step 510), but when it is in ECU replacement mode it outputs a request for readout of function data, etc. to the CPU 20a (step 502).

When it receives a readout request from the checker 40, the CPU 20a executes the function data, etc. readout processing 400 shown in FIG. 8 and first reads out the function data, etc. stored in the EEPROM 20f and sends it to the checker 40 (step 401).

The checker 40 receives the function data etc. sent from the CPU 20a (step 503) and determines whether or not the function data, etc. from the CPU 20a has been correctly read out (step 504). When it has been correctly read out, the checker 40 outputs a function data, etc. write request to the CPU 30a and writes the function data, etc. into the CPU 30a (step 505).

When the write request is outputted from the checker 40, the CPU 30a stores that function data, etc. in the EEPROM 30f (step 302). After that, to confirm whether or not the function data, etc. has been correctly written, the CPU 30a reads the stored function data, etc. from the EEPROM 30f and sends it to the checker 40 (step 303).

The checker 40 sends the function data etc. sent to it from the CPU 30a to the CPU 20a (step 506).

When the CPU 20a receives the function data, etc. sent from the CPU 30a from the checker 40 (step 402), it collates that function data, etc. with the function data, etc. stored in the EEPROM 20f (step 403). If the collation result is a match, the CPU 20a sends a "writing OK" report to the checker 40 (step 404) and erases the function data, etc. stored in the EEPROM 20f. If the collation results do not match, it sends a "writing NG" report to the checker 40 (step 406). The reason for erasing the function data, etc. stored in the EEPROM 20f is to avoid producing a duplicate ECU.

The checker 40 identifies the information received from the CPU 20a (step 507), and when it is a "writing OK" report, sends notification to the effect that the collation result is a "match" to the CPU 30a (step 508), and when it is a "writing NG" report, sends notification to the effect that the collation result is a "mismatch" to the CPU 30a (step 509).

The CPU 30a recognizes the information showing the collation result from the checker 40 (step 304), and when the collation result is a "match" ends function, data etc. writing and when the collation result is a "mismatch", infers that there has been a writing failure and clears the function code stored in the EEPROM 30f and carries out processing to return to the initial code (step 305). This is because if the function code is not returned to the initial code, it is not possible to carry out writing again.

As will be clear from the above description, with this preferred embodiment, when the ECU 20 fails, it is possible to write the function data, etc. stored in the EEPROM 20f of the failed ECU 20 into a new ECU 30 and therefore it is possible to use the same keys as before with the new ECU 30.

Although the present invention has been fully described in connection with the preferred embodiments thereof with reference to the accompanying drawings, it is to be noted that various changes and modifications will become apparent to those skilled in the art. For example, the present invention is not limited to application to vehicles having engines, and for example can also be applied to vehicles such as electric vehicles not having engines, and can be applied to mobile bodies other than vehicles—for example, boats. Such changes and modifications are to be understood as being included within the scope of the present invention as defined by the appended claims.

What is claimed is:

1. A method for registering a new key in an anti-theft device, comprising:

preparing a new key having a transponder in which authentication data has not been written;

conducting communication between a transponder of a registered key and an electronic control unit having an anti-theft function, and determining if the communication was conducted correctly;

enabling registration of a new key when it is determined that the communication was conducted correctly; and when registration of a new key is enabled, conducting communication between the transponder of the new key and the electronic control unit and writing registered key authentication data stored in the electronic control unit into the transponder of the new key.

2. A method for registering a new key in an anti-theft device according to claim 1, further comprising:

after the writing is carried out, conducting communication between the transponder of the new key and the electronic control unit and checking whether or not the authentication data has been written into the transponder of the new key correctly; and informing an operator registering the new key of the result of the check.

3. A method for registering a new key in an anti-theft device according to claim 1, wherein:

conducting communication between the transponder of the registered key and the electronic control unit is done through transmission of communication data;

enabling registration of the new key includes disengaging an anti-theft mode when authentication data stored in the transponder, different from the communication data, is identical to authentication data stored in the electronic control unit; and writing authentication data stored in the electronic control unit into the transponder of the new key is performed when a new key is subsequently placed in communication with the electronic control unit.

4. A method for registering a new key in an anti-theft device according to claim 1, wherein:

conducting communication between the transponder of the registered key and the electronic control unit includes transmitting query data from the electronic control unit to the transponder of the registered key, and preparing response data based on authentication data stored in the transponder and the transmitted query data, and transmitting the prepared response data to the electronic control unit from the registered key transponder;

determining if communication between the transponder of the registered key and the electronic control unit was conducted correctly includes, at the electronic control unit, preparing response data based on the query data and the authentication data stored in the electronic control unit, and comparing the response data at the electronic control unit with the response data sent from the transponder; and writing the authentication data stored in the electronic control unit into the transponder of the new key is done when the response data at the electronic control unit and the response data sent from the transponder are identical.

5. An anti-theft device comprising:

an electronic control unit having storing means for storing authentication data of a registered key, the electronic control unit being for conducting communication with a transponder of a registered key and collating the authentication data stored in the storing means with authentication data written in the transponder, and determining if the result of the collation is a match, and when the collation result is a match, making starting of an engine possible;

wherein when authentication data is to be written into a transponder of a new key, the electronic control unit conducts communication with the transponder of the registered key and collates the authentication data stored in the storing means with the authentication data written in the transponder of the registered key, and when the result of the collation is a match, allows the writing of authentication data into the transponder of the new key.

6. An anti-theft device according to claim 5, wherein:

the electronic control unit comprises means for writing a key identification code of the new key into the transponder of the new key and the storing means; and the electronic control unit collates the authentication data and the key identification codes and enables the engine to be started when the result of the collation is a match.

7. An anti-theft device according to claim 5, wherein:

the electronic control unit comprises means for determining that a registration operation for carrying out registration of a new key has been carried out; and the electronic control unit carries out the writing of authentication data into the transponder of the new key when it determines that the collation result is a match and that the registration operation has been carried out.

8. An anti-theft device according to claim 5, wherein the electronic control unit comprises means for, after the writing is carried out, conducting communication with the transponder of the new key and checking whether or not the authentication data has been written into the new key correctly, and informing a user registering the new key of the result of the check.

9. An anti-theft device according to claim 5, wherein the transponders of the registered key and the new key are such that once authentication data has been written into the transponder, the authentication data cannot be read out to the outside from the transponder.

10. An anti-theft device according to claim 5, wherein the authentication data is function data for operating on query data sent from the electronic control unit at the time of anti-theft determination.

11. A method for registering a new key in an anti-theft device according to claim 5, wherein:

the electronic control unit conducts communication with the transponder of the registered key through transmission of communication data; and the writing of authentication data into the transponder of the new key is done by disengaging an anti-theft mode when authentication data stored in the transponder, different from the communication data, is identical to authentication data stored in the electronic control unit, and is performed when a new key is subsequently placed in communication with the electronic control unit.

12. A method for registering a new key in an anti-theft device according to claim 5, wherein:

the electronic control unit conducting communication with the transponder of the registered key includes the electronic control unit transmitting query data to the transponder of the registered key, and preparing response data based on authentication data stored in the transponder and the transmitted query data, and transmitting the prepared response data to the electronic control unit from the registered key transponder;

collating the authentication data in the storing means with the authentication data in the transponder of the registered key includes, at the electronic control unit, preparing response data based on the query data and the authentication data stored in the electronic control unit, and comparing the response data at the electronic control unit with the response data sent from the transponder; and writing the authentication data into the transponder of the new key is done when the response data at the electronic control unit and the response data sent from the transponder are identical.

13. A method for registering a new key in an anti-theft device, comprising:

preparing a new key having a transponder in which authentication data has not been written;

conducting communication between a transponder of a pre-registered master key and an electronic control unit having an anti-theft function and determining if the communication was conducted correctly;

allowing registration of a new key when determining that the communication was conducted correctly; and conducting communication between the transponder of the new key and the electronic control unit and by this communication writing authentication data matching authentication data of the master key into the transponder of the new key.

14. A method for registering a new key in an anti-theft device according to claim 13, wherein communication data sent by the transponder of the master key to the electronic control unit includes, in addition to the authentication data, a key identification code identifying the master key.

15. A method for registering a new key in an anti-theft device according to claim 13, wherein:

conducting communication between the transponder of the master key and the electronic control unit is done through transmission of communication data;

allowing registration of the new key includes disengaging an anti-theft mode when authentication data stored in the transponder, different from the communication data, is identical to authentication data stored in the electronic control unit; and writing authentication data of the master key into the transponder of the new key is performed when a new key is subsequently placed in communication with the electronic control unit.

16. A method for registering a new key in an anti-theft device according to claim 13, wherein:

conducting communication between the transponder of the master key and the electronic control unit includes transmitting query data from the electronic control unit to the transponder of the master key, and preparing response data based on authentication data stored in the transponder and the transmitted query data, and transmitting the prepared response data to the electronic control unit from the master key transponder;

determining if communication was conducted correctly includes, at the electronic control unit, preparing response data based on the query data and the authentication data stored in the electronic control unit, and comparing the response data at the electronic control unit with the response data sent from the transponder; and writing the authentication data into the transponder of the new key is done when the response data at the electronic control unit and the response data sent from the transponder are identical.

17. A method for registering a new key in an anti-theft device according to claim 14, wherein a key identification code different from the key identification code of the master key is written into the transponder of the new key in addition to the authentication data matching the authentication data of the master key.

18. A method for registering a new key in an anti-theft device according to claim 7, wherein the authentication data and key identification codes respectively assigned to a plurality of keys having the same authentication data are stored in the electronic control unit and only when recognizing the key identification code of the master key does the electronic control unit allow registration of the new key.

19. An electronic control unit for conducting communication with a transponder of an electronic key and controlling the ability of an object of theft prevention to be operated, the electronic control unit comprising:

storing means for storing authentication data of a proper registered key;

determining means for determining by communication with the electronic key whether or not the electronic key is a registered key;

permitting means for permitting access to the object of theft prevention when the determining means determines the electronic key to be a registered key; and mode switching means by which is set a readout mode enabling the authentication data registered in the storing means to be sent outside the storing means when the determining means determines the electronic key to be a registered key;

wherein the authentication data is function data for operating on query data sent from the electronic control unit at the time of anti-theft determination.

20. An electronic control unit according to claim 19, wherein in the readout mode the authentication data registered in the storing means can be sent to a new key having a transponder in which authentication data has not been written.

21. An electronic control unit according to claim 19, wherein in the readout mode the authentication data registered in the storing means can be sent to another electronic control unit having storing means in which authentication data of a registered key has not been written.

22. An electronic control unit according to claim 19, further comprising:

means for determining that a registration operation for carrying out registration of a new key has been carried out;

wherein the electronic control unit carries out writing of authentication data into the transponder of the new key when the determining means determines that the electronic key is a registered key and the registration operation has been carried out.

23. An electronic control unit according to claim 19, wherein the authentication data is function data for operating on query data sent from the electronic control unit at the time of anti-theft determination.

24. A electronic control unit for registering a new key in an anti-theft device according to claim 19, wherein:

the determining means is for determining whether the electronic key is a registered key by conducting communication between the transponder of the registered key and the electronic control unit through transmission of communication data;

the permitting means is for permitting access by disengaging an anti-theft mode when authentication data stored in the transponder, different from the communication data, is identical to authentication data stored in the electronic control unit; and further comprising writing means for writing authentication data stored in the electronic control unit into the transponder of a new key when a new key is subsequently placed in communication with the electronic control unit after the mode switching means sets the readout mode.

25. A electronic control unit for registering a new key in an anti-theft device according to claim 19, wherein:

the determining means is for determining whether the electronic key is a registered key by transmitting query data from the electronic control unit to the transponder of the electronic key, preparing response data based on authentication data stored in the transponder and the transmitted query data, and transmitting the prepared response data to the electronic control unit from the electronic key transponder, and at the electronic control unit, preparing response data based on the query data and the authentication data stored in the electronic control unit, and comparing the response data at the electronic control unit with the response data sent from the transponder; and further comprising writing means for writing the authentication data stored in the electronic control unit into the transponder of a new key is done when the mode switching means determines that the response data at the electronic control unit and the response data sent from the transponder are identical and thus that the electronic key is a registered key.

26. An electronic control unit according to claim 20, further comprising:

means for writing a key identification code of the new key into the transponder of the new key and the storing means;

wherein the determining means determines that the electronic key is a registered key when authentication data and a key identification code written in the electronic key match authentication data and a key identification code stored in the storing means match.

27. An electronic control unit according to claim 20, further comprising means for, after sending the authentication data, conducting communication with the transponder of the new key and checking whether or not the authentication data has been written into the new key correctly, and informing a user registering the new key of the result of the check.

28. An electronic control unit according to claim 20, wherein the transponders of the registered key and the new key are such that once authentication data has been written into the transponder, the authentication data cannot be read out from the transponder.

29. An anti-theft device comprising:

an electronic control unit having storing means for storing authentication data of a pre-registered master key, the electronic control unit being for conducting communication with a transponder of the master key, collating the authentication data stored in the storing means with authentication data written in the transponder, and determining if the result of the collation is a match, and when the collation result is a match, making starting of an engine possible;

wherein when authentication data is to be written into a transponder of a new key, the electronic control unit conducts communication with the transponder of the master key and collates the authentication data stored in the storing means with the authentication data written in the transponder of the master key, and when the result of the collation is a match, allows the writing of authentication data matching the authentication data of the master key into the transponder of the new key.

30. An anti-theft device according to claim 29, wherein communication data sent by the transponder of the master key to the electronic control unit includes, in addition to the authentication data, a key identification code identifying the master key.

31. A method for registering a new key in an anti-theft device according to claim 29, wherein:

the electronic control unit conducts communication with the transponder of the master key through transmission of communication data; and the writing of authentication data into the transponder of the new key is done by disengaging an anti-theft mode when authentication data stored in the transponder, different from the communication data, is identical to authentication data stored in the electronic control unit, and is performed when a new key is subsequently placed in communication with the electronic control unit.

32. A method for registering a new key in an anti-theft device according to claim 29, comprising:

the electronic control unit conducting communication with the transponder of the master key includes the electronic control unit transmitting query data to the transponder of the master key, and preparing response data based on authentication data stored in the transponder and the transmitted query data, and transmitting the prepared response data to the electronic control unit from the master key transponder;

collating the authentication data in the storing means with the authentication data in the transponder of the master key includes, at the electronic control unit, preparing response data based on the query data and the authentication data stored in the electronic control unit, and comparing the response data at the electronic control unit with the response data sent from the transponder; and writing the authentication data into the transponder of the new key is done when the response data at the electronic control unit and the response data sent from the transponder are identical.

33. An anti-theft device according to claim 30, wherein a key identification code, different from the key identification code of the master key, is written into the transponder of the new key in addition to the authentication data matching the authentication data of the master key.

34. An anti-theft device according to claim 33, wherein the authentication data and key identification codes respectively assigned to a plurality of keys having the same authentication data are stored in the electronic control unit, and only when recognizing the key identification code of the master key does the electronic control unit allow registration of the new key.

* * * * *